Figure 1:
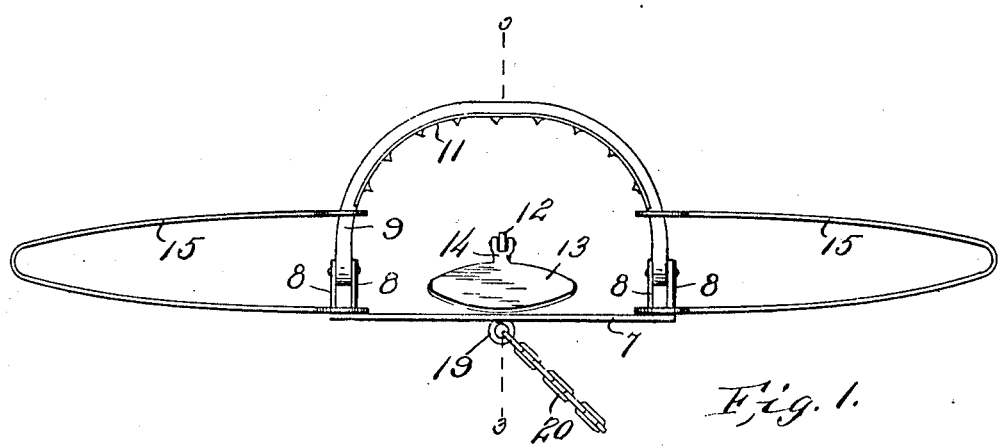

No. 888,325. PATENTED MAY 19, 1908.
W. R. GREEN.
TRAP.
APPLICATION FILED JUNE 12, 1907.

2 SHEETS—SHEET 1.

Inventor
W. R. Green,

Witnesses

By

Attorneys

No. 888,325.  PATENTED MAY 19, 1908.
W. R. GREEN.
TRAP.
APPLICATION FILED JUNE 12, 1907.

2 SHEETS—SHEET 2.

Witnesses

Inventor
W. R. Green,
By
Attorneys

UNITED STATES PATENT OFFICE.

WILLIAM R. GREEN, OF VERNAL, UTAH.

TRAP.

No. 888,325.  Specification of Letters Patent.  Patented May 19, 1908.

Application filed June 12, 1907. Serial No. 378,597.

*To all whom it may concern:*

Be it known that I, WILLIAM R. GREEN, a citizen of the United States, residing at Vernal, in the county of Uinta, State of Utah, have invented certain new and useful Improvements in Traps; and I do hereby declare the following to be a full, clear, and exact description of the invention, such as will enable others skilled in the art to which it appertains to make and use the same.

The present invention has reference to improvements in jaw-traps.

Heretofore devices of this nature have been defective in that the open base prevents the trap from resting squarely upon the bed of a stream, owing to the projection of stumps and roots, therethrough, and, at the same time, permits the trap to be easily overturned by animals passing over it. The direct engagement of the pan, furthermore, with one of the jaws, and the position of the trigger outside of the radius of the trap frequently has the effect of forcing the animal's foot upwardly outside of the trap before the jaws can close thereon, while the provision of teeth upon both jaws frequently either cuts the animal's foot directly off or cuts so far through it that the animal may twist its foot off and escape.

It is the object of the present invention, therefore, to provide a trap in which the above recited defects are obviated, and to this end the trap, briefly described, consists of a solid circular base-plate, to which the jaws are pivoted at opposite ends, and which carries adjacent its periphery the setting trigger, whose pan extends across the face of the base-plate, the actuating springs for the jaws being movable bodily in a horizontal plane towards the trigger when the trap is set.

The invention further consists in the construction, combination and arrangement of parts, all as hereinafter more fully described, specifically claimed, and illustrated in the accompanying drawings, in which like parts are designated by corresponding reference numerals in the several views.

Figure 2:
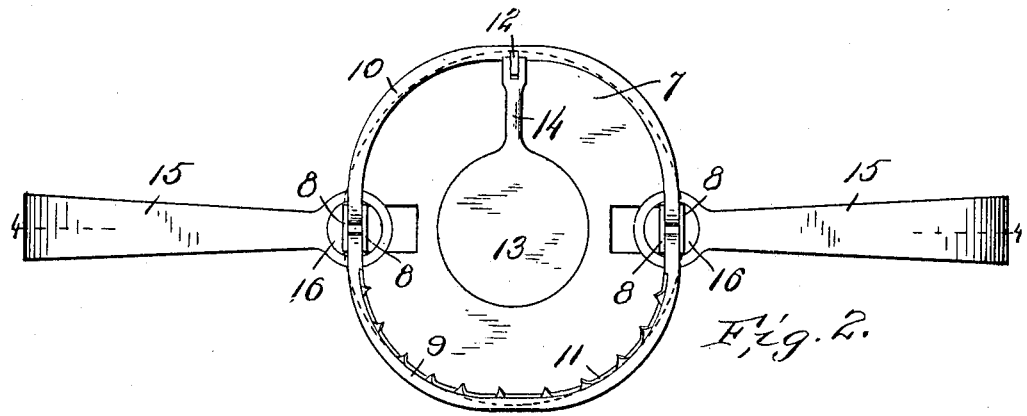
Figure 5:
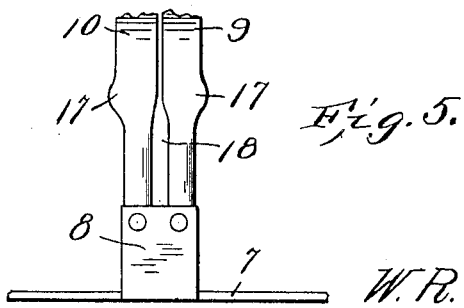
Figure 3:
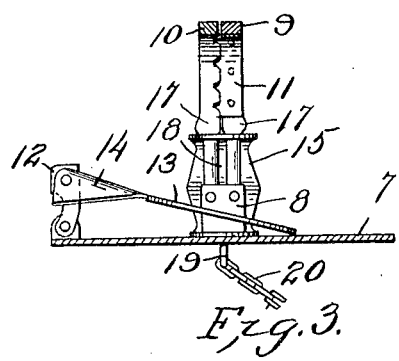
Figure 4:
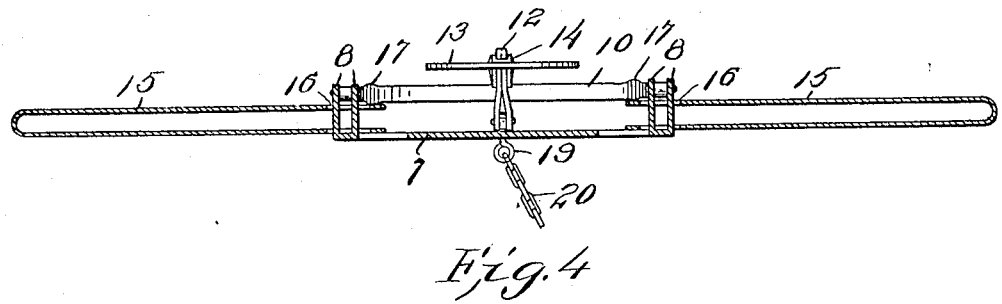

Of the said drawings—Figure 1 is a front elevation of the trap prior to being set. Fig. 2 is a top plan view of the trap when set. Fig. 3 is a section taken on the line 3—3 of Fig. 1. Fig. 4 is a section taken at right-angles to Fig. 3, on the line 4—4 of Fig. 2. Fig. 5 is a fragmental detail elevation of the jaw ends, showing the lateral enlargement thereof.

In its practical embodiment, the trap comprises a base-plate 7, which, as shown, is constructed from a circular blank of sheet steel, provided at diametrically opposite points with the pairs of ears 8, to which the lower ends of the jaws 9 and 10 are pivoted, the former having secured to its under face a plate 11, provided with laterally-projecting teeth. The base-plate is further provided with a trigger 12 pivoted thereto adjacent its periphery intermediate the pairs of ears 8, the hooked end of the trigger being adapted for engagement with the jaw 10 when the trap is set, as hereinafter described. The trigger is in turn provided with a circular pan 13, whose stem portion 14 is bifurcated at its free end, and is pivotally connected with the trigger at such point.

The jaws, above referred to, are normally retained in vertical position with their mutually-adjacent faces in contact by means of a pair of V-shaped springs 15, the free ends of said springs being provided with openings 16, through which the pairs of ears 8 and the lower ends of the jaws extend, as shown in Fig. 3. The lower ends of the jaws are enlarged laterally, as indicated by the reference numeral 17, and as shown in Fig. 5, to provide stops against which the upper members of the springs bear, thus retaining the latter in proper position for their swinging movement hereinafter described. The inner faces of the jaws adjacent their pivotal points, are cut away slightly, as indicated by the numeral 18, and are beveled or rounded at such points to prevent gravel and fine pebbles and the like from becoming lodged between the jaws and preventing the operative portions thereof from closing tightly when the trap is sprung. The base-plate of the trap is further provided centrally with a depending eye-bolt 19, which is swiveled thereto and serves as a means of attachment for one end of a chain or other flexible element 20, by means of which the trap is held in place upon the stream bed, the opposite end of the chain being made fast in any desired manner.

In setting the trap, the upper members of the springs 15 are pressed downwardly, and the jaw 10 swung toward the base-plate and engaged with the trigger-hook, which action will raise the pan 13 a slight distance from the base-plate. The pressure upon the springs is then released and the latter are swung towards the trigger, and the toothed jaw 9 then lowered into approximately horizontal position. The trap is sprung when an animal steps upon the pan depressing the same and releasing the jaw 10 from engagement with the trigger, whereupon the springs will be free to close the jaws simultaneously upon the animal's leg.

It will be apparent from the foregoing that the trap, when set, will rest squarely upon the bed of the stream, and is capable of turning freely in either direction, owing to the swiveled connection of the eye-bolt with the base-plate, so that the trap is not liable to be upset or overturned, while, at the same time, the pivotal mounting of the pan above described is such that the foot of the animal is not forced upwardly out of reach of the jaws when the trap is sprung. It will likewise be apparent that the enlarged portions 17 of the jaws serve as stops which limit the upward movement of the upper arm of the springs, and thus maintain the latter at all times under tension, while the provision of the openings 18 between the jaws prevents any gravel or fine pebbles from becoming lodged between the jaws when the trap is sprung, thus preventing the jaws from closing tightly together.

What is claimed, is—

In a jaw-trap, the combination with a base-plate provided at diametrically opposite points with a pair of integrally formed ears, a pair of jaws pivoted at opposite ends to said ears and provided with stops adjacent such points, a pair of V-shaped springs pivotally connected with the opposite ends of said jaws for actuating the latter, a trigger pivoted to said base-plate adjacent the periphery thereof and adapted for engagement with one of said jaws, to lock the same in open position against the action of said springs, a depressible pan pivoted to said trigger and extending diametrically across the base-plate, said springs being adapted to be swung bodily in a horizontal plane towards the trigger, when the trap is set, a depending eye-bolt swiveled centrally to the base-plate, and a chain connected with said eye-bolt for preventing displacement of the trap.

In testimony whereof, I affix my signature, in presence of two witnesses.

WILLIAM R. GREEN.

Witnesses:
S. A. GREEN,
JAMES L. SWETT.